(12) United States Patent
Cross et al.

(10) Patent No.: US 8,751,547 B2
(45) Date of Patent: Jun. 10, 2014

(54) MULTIPLE FILE SYSTEM AND/OR MULTI-HOST SINGLE INSTANCE STORE TECHNIQUES

(75) Inventors: James Cross, San Francisco, CA (US); Douglas Fallstrom, Menlo Park, CA (US)

(73) Assignee: Symantec Corporation, Mountain View, CA (US)

( * ) Notice: Subject to any disclaimer, the term of this patent is extended or adjusted under 35 U.S.C. 154(b) by 429 days.

(21) Appl. No.: 12/716,282

(22) Filed: Mar. 3, 2010

(65) Prior Publication Data

US 2011/0219048 A1 Sep. 8, 2011

(51) Int. Cl.
*G06F 17/30* (2006.01)
(52) U.S. Cl.
USPC .......................................... 707/821; 711/162
(58) Field of Classification Search
USPC .......................................... 707/821; 711/162
See application file for complete search history.

(56) References Cited

U.S. PATENT DOCUMENTS 7,873,619 B1 * 1/2011 Faibish et al. ................. 707/705
2009/0024752 A1 * 1/2009 Shitomi ........................ 709/230

* cited by examiner

*Primary Examiner* — Amresh Singh
(74) *Attorney, Agent, or Firm* — Wilmer Cutler Pickering Hale and Dorr LLP

(57) ABSTRACT

A multiple file system and/or multi-host single instance store technique includes receiving one or more commands and one or more parameters to create a single instance store, a plurality of volumes and one or more file systems. Information creating the plurality of volumes, including creating a plurality of thin volumes on top of a single instance store solution, are stored in a volume manager configuration file. Information creating the one or more file systems, wherein each file system is created on top of the plurality of volumes including the plurality of thin volumes, are stored in a file system configuration file.

15 Claims, 8 Drawing Sheets

MULTIPLE FILE SYSTEM AND/OR MULTI-HOST SINGLE INSTANCE STORE TECHNIQUES

BACKGROUND OF THE INVENTION

In conventional storage systems, multiple instances of data are commonly stored. For example, multiple users may store the same document on a storage system. In another example multiple instances of applications, such as the operating system, may be stored on the file system of a virtual machine platform. Single instance store techniques may be utilized to search a storage device to identify duplicate instances of data. When duplicate instances of data are identified, one instance of the data is stored in a common store and the other instances are replaced by pointers to the instance in the common store. The process of identifying and replacing the multiple instances may be referred to as de-duplicating or deduping. Single Instance Store (SIS) is typically solved either at the storage array level or within a file system. Such techniques reduce the efficiency of the single instance store if the system has more than one array or more than one file system. Accordingly, there is a continued need for improved single instance store techniques for multiple file systems.

SUMMARY OF THE INVENTION

The present technology may best be understood by referring to the following description and accompanying drawings that are used to illustrate embodiment of the present technology.

Embodiments of the present technology are directed toward instance store techniques shared across multiple file systems and/or multiple hosts. In one embodiment, the single instance store technique includes receiving one or more commands and one or more parameters to create a single instance store, a plurality of volumes and one or more file systems. Information creating the plurality of volumes, including creating a plurality of thin volumes on top of a single instance store solution, is stored in a volume manager configuration file. Information creating the one or more file systems, wherein each file system is created on top of the plurality of volumes including the plurality of thin volumes, is stored in a file system configuration file.

In one embodiment, the one or more file systems include dynamic storage tiering.

In one embodiment, information creating a cache object on top of a backing store of the single instance store solution, wherein the plurality of thin volumes are created on top of the cache object, is stored in the volume manager configuration file.

In one embodiment, one or more input/output request are received and the memory accesses are selective single instance stored based on the policy.

In one embodiment, the cache object is shared between the volume sets.

BRIEF DESCRIPTION OF THE DRAWINGS

Embodiments of the present technology are illustrated by way of example and not by way of limitation, in the figures of the accompanying drawings and in which like reference numerals refer to similar elements and in which.

DETAILED DESCRIPTION OF THE INVENTION

Figure 1:
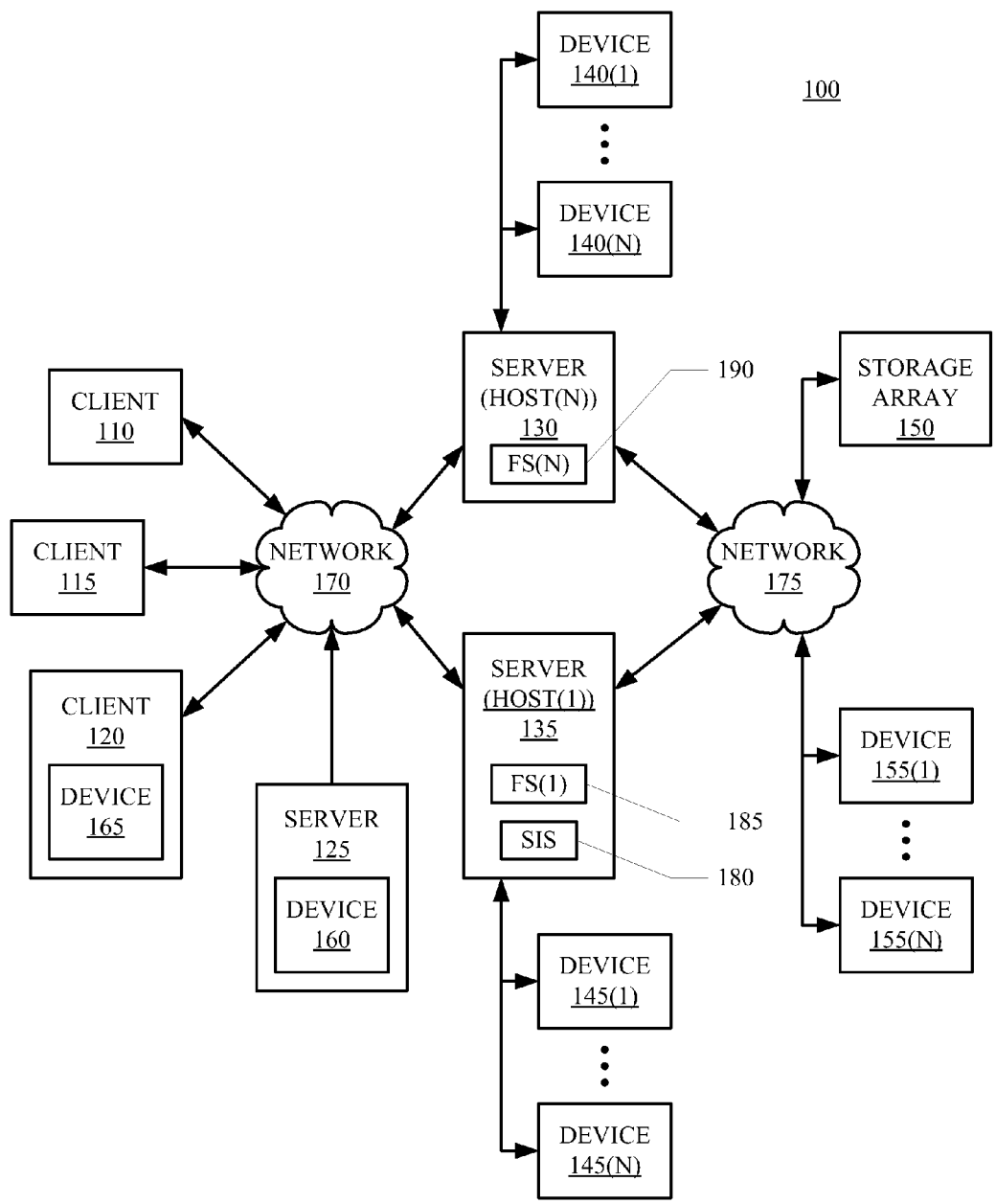
FIG. 1 shows a block diagram of an exemplary computing environment for implementing a single instance store across multiple file systems and/or multiple hosts in accordance with one embodiment of the present technology.

Reference will now be made in detail to the embodiments of the present technology, examples of which are illustrated in the accompanying drawings. While the present technology will be described in conjunction with these embodiments, it will be understood that they are not intended to limit the invention to these embodiments. On the contrary, the invention is intended to cover alternatives, modifications and equivalents, which may be included within the scope of the invention as defined by the appended claims. Furthermore, in the following detailed description of the present technology, numerous specific details are set forth in order to provide a thorough understanding of the present technology. However, it is understood that the present technology may be practiced without these specific details. In other instances, well-known methods, procedures, components, and circuits have not been described in detail as not to unnecessarily obscure aspects of the present technology.

References within the specification to "one embodiment" or "an embodiment" are intended to indicate that a particular feature, structure, or characteristic described in connection with the embodiment is included in at least one embodiment of the present invention. The appearance of the phrase "in one embodiment" in various places within the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Some portions of the detailed descriptions, which follow, are presented in terms of procedures, steps, logic blocks, processing, and other symbolic representations of operations on data bits within a computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals of a computer readable storage medium and are capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "accessing" or "writing" or "storing" or "replicating" or the like, refer to the action and processes of a computer system, or similar electronic computing device that manipulates and transforms data represented as physical (electronic) quantities within the computer system's registers and memories and other computer readable media into other data similarly represented as physical quantities within the computer system memories or registers or other such information storage, transmission or display devices.

Embodiments of the present technology are directed toward techniques for implementing a Single Instance Store (SIS) across multiple file systems and/or multiple hosts. The techniques utilize the idea of a single instance store implemented at the block storage level on one or more hosts. In one implementation, the block storage level may be a cache object level. Embodiments combine features such as Dynamic Storage Tiering (DST) and Cluster Volume Manager (CVM) along with a new way of creating volumes (e.g., thin volumes). Dynamic storage tiering allows for creating a file system on top of a set of volumes (e.g., volume set). Dynamic storage tiering further allows for creating policies in the file system to place data on a given tier of storage. Dynamic storage tiering is further described in U.S. patent application Ser. No. 12/551,221, filed Aug. 31, 2009, which is incorporated herein by reference. Thin volumes techniques are utilized for creating an empty volume on top of a cache object. The thin volume can be built on top of any storage and the cache object can be shared with other thin volumes and/or volume sets. With a single instance store implemented in the cache object, a single instance store tier can be shared across multiple file systems. Sharing across multiple file systems can increase the space efficiency of the single instance store.

Referring to FIG. 1, an exemplary computing environment 100 for implementing a single instance store across multiple file systems and/or multiple hosts in accordance with one embodiment of the present technology is shown. The computing environment may include one or more client 110-120 and/or one or more server 125-135 computing devices. The one or more client and/or server computing devices 110-135 may be implanted using a computing device 200 such as described below with reference to FIG. 2. The computing system also includes a plurality of storage devices 140(1)-(N), 145(1)-(N), 150, 155(1)-(N), 160-165. The storage devices may be implemented as a disk server, an intelligent storage array, disk drive of a server or client computing device and/or the like. The storage devices may be magnetic disk, optical disk, solid state disk, magnetic disk devices and/or the like. The one or more clients, one or more servers and one/or more storage devices may be coupled by one or more networks 170-175. In addition, one or more of the clients, one or more servers and/or one or more of the storage devices may be distributed in a cloud computing environment. The single instance store (SIS) 180 may implemented across one or more files systems (FS) 185, 190 and/or across one or more hosts 130, 135 of the exemplary computing environment 100.

Figure 2:
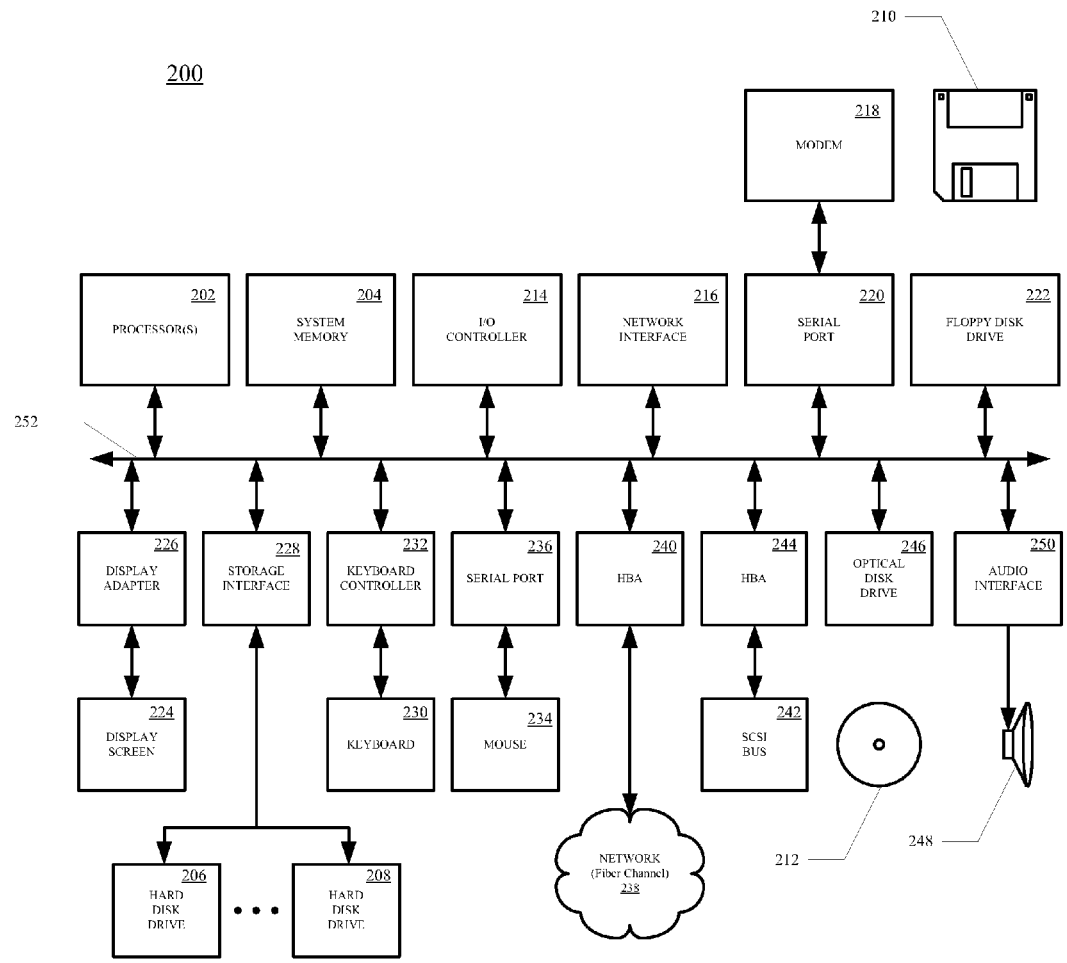
FIG. 2 shows a block diagram of an exemplary computing device suitable for implementing the servers and/or clients of the exemplary computing environment.

Referring now to FIG. 2, an exemplary computing device 200 suitable for implementing the servers and/or clients of the exemplary computing environment 100 is shown. The computing device 200 may include one or more processors 202, one or more computing device readable media 204, 206, 208, 210, 212, and one or more input/output devices 214. In one implementation, the computing device includes a central processing unit (CPU) 202, a system memory 204 (typically RAM, but which may also include ROM, flash RAM, and/or the like), and an input output controller hub 214. The input/output controller hub 214 provides for communication between the CPU 202, the system memory 204 and input/output devices such as a network interface 216, a modem 218 via a serial port interface 220, a floppy disk drive 222, a display 224 via a display adapter 226, one or more fixed disks (e.g., hard disk drive (HDD)) 206, 208, disk arrays or the like via a storage interface 228, a keyboard 230 via a keyboard controller 232, a mouse 234 via a serial port 236, a fiber channel network 238 via a host bus adapter (HBA) 240, an SCSI bus 242 via an HBA 244, an optical disk drive 246, an speaker 248 via an audio interface 250, and/or the like. The one or more processors 202, one or more computing device readable media 204, 206, 208, 210, 212, and one or more input/output devices 214-250 are communicatively coupled together by one or more buses 252.

The modem 218 may provide a connection to a remote server or client via a telephone link or to the Internet via an internet service provide (ISP). The network interface 240 may provide a connection to a remote server or client via a network link 238 to the Internet via a POP (point of presence). The network interface may provide such connection using wired or wireless techniques, including digital cellular telephone connection, Cellular Digital Packet Data (CDPD) connection, digital satellite data connection or the like.

Many other devices or subsystems (not shown) may be connected in a similar manner e.g., printer, document scanners, digital cameras, and so on). Conversely, all of the devices shown in FIGS. 1 and 2 need not be present to practice the present technology. The devices and subsystems can be interconnected in different ways from that shown in FIGS. 1 and 2. The operation of a computer system, such as that shown in FIGS. 1 and 2 are readily known in the art and is not discussed in detail in the application. Code to implement the present technology can be stored in computing device readable media such as one or more of system memory 204, fixed disk 206, 208, optical disk 212, or floppy disk 210. The operating system provided on the computer device may be MS-DOS®, MS-Windows®, OS/2®, Unix®, Linux®, or another known operating system.

It should further be noted, that the computer system 200 can have some, most, or all of its functionality supplanted by a distributed computer system having a large number of dispersed computing nodes, such as would be the case where the functionality of the computer system 200 is partly or wholly executed using a cloud computing environment.

Figure 3:
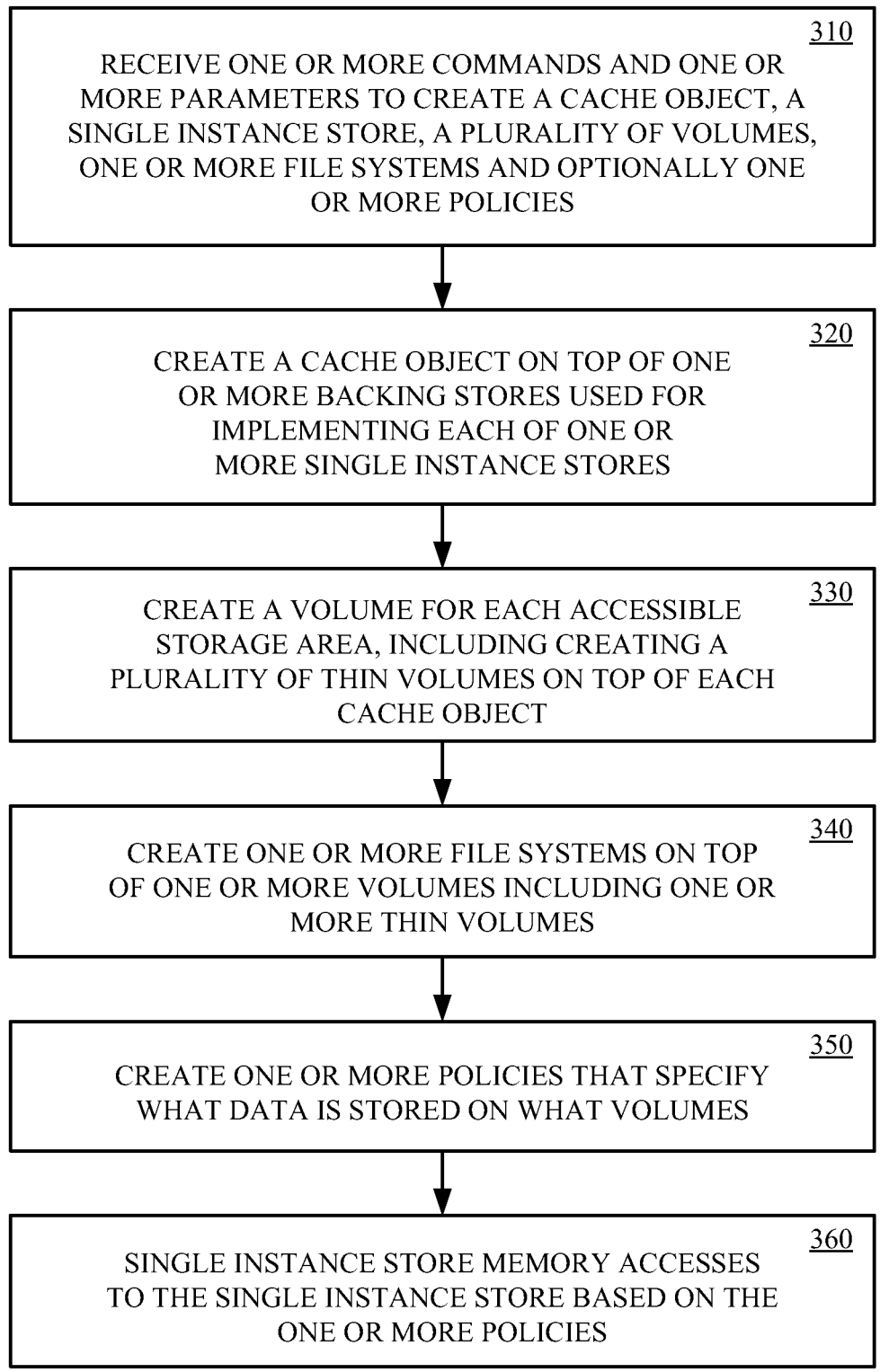
FIG. 3 shows a method of setting up a multiple file system single instance store, in accordance with one embodiment of the present technology.

Referring to FIG. 3, a method of setting up a multiple file system single instance store, in accordance with one embodiment of the present technology, is shown. The method will be further explained with reference to FIG. 4, which shows an exemplary multiple file system singe instance store. The multiple file system single instance store 400 includes a plurality of storage devices 405, 410, 415, also referred to as backing stores. In addition, the backing store may be a storage device 410, storage device partition, a storage device array, or the like. The method includes receiving one or more commands and one or more parameters to create a single instance store solution, a plurality of volumes, one or more file systems, at 310. One or more commands and one or more parameters may also be received for creating one or more data storage policies.

At 320, a cache object 420 is created on top of each backing store used for implementing each of one or more single instance store solutions 425 based upon the one or more commands and one or more parameters. In one embodiment, a volume manager receives the one or more commands and one or more parameters for configuring a cache object used for implementing a single instance store. The volume manager transforms the one or more commands and one or more parameters into information creating the cache object on top of one or more backing stores used for implementing one or more single instance store solutions. The information creating the cache object and the single instance store solution is stored in a configuration file of the volume manager.

In one implementation, the cache object 420 is created by allocating a block of storage (e.g., gigabyte). The block size of the cache object 420 may be user-selectable or auto-selected based on the file system. The cache object includes a process for calculating a CRC check sum for blocks allocated on the cache object and stores them. The CRC check sums may be used to determine the presence of duplicate data in the single instance store solution 425. A cache object 420 allows the creation of thin volumes. Any write to a new region of the thin volume results in blocks being allocated in the thin volume from the cache object.

At 320, a volume 430-445 is created for each accessible storage area 405-415, including creating a plurality of thin volumes 440, 445 on top of each cache object based upon the one or more commands and one or more parameters. The plurality of thin volumes 440, 445 are created on each cache object 420 so that the cache object 420 can be shared between thin volumes 440, 445. The volumes 430-445 exist at the logical operating system (OS) level and are utilized by an operating system to access data stored on a corresponding accessible storage area (e.g., hard disk driver, partition). Each thin volume may have a large virtual address space (e.g., gigabyte, terabyte). A thin volume 440, 445 is created on the cache object 420 and is substantially 'empty', except for a small amount of metadata, until data is written to the thin volume. In one embodiment, a volume manager receives the one or more commands and one or more parameters for configuring the one or more volumes. The volume manager transforms the one or more commands and one or more parameters into information creating the volumes on top of each accessible storage area, including creating a plurality of thin volumes on top of each cache object. The information creating the volumes, including the plurality of thin volumes, is stored in a configuration file of the volume manager.

In one embodiment, one or more volumes 430, 435 and one or more thin volumes 440, 445 may be combined into a volume set 450, 455. This is illustrated in FIG. 3, wherein the volume V1 430 and thin volume T1 440 are combined, as illustrated by the dashed boxes, as volume set S1 450. In one implementation, one or more volume stacks 450, 440, 430 are created using a volume manager, such as Veritas Volume Manager (VxVM), or the like. The volume stacks allow the cache object 420 to be shared between multiple thin volumes and/or volume sets, thereby allowing the single instance store solution 425 to be shared on a multiple file system and/or also multi-host platforms. The host may be a computing device, such as described in FIGS. 1, 2 and 7. However, a non-shared file system can be created on a shared volume for workloads that don't need or utilize a file system such as Veritas file system (VxFS).

At 340, one or more file systems 460, 465 are created on top of one or more volumes including one or more thin volumes, based upon the one or more commands and one or more parameters. The file system is a special-purposed database for the storage, organization, manipulation and retrieval of data. In one implementation, a storage manager may be utilized to create a file system stack, including the one or more file systems, on top of a volume stack, including the one or more volume sets.

In one embodiment, a file manager receives one or more commands and one or more parameters for configuring the one or more file systems. The file manager transforms the one or more commands and one or more parameters into information creating the file systems on top of the one or more volumes. The information creating the file systems is stored in a configuration file of the file manager.

In one embodiment, one or more file systems 460, 465 are created on top of one or more volume sets 450, 455. In one implementation, the volumes within a volume set are defined inside the file system as tiers so that they are kept abstract.

Figure 4:
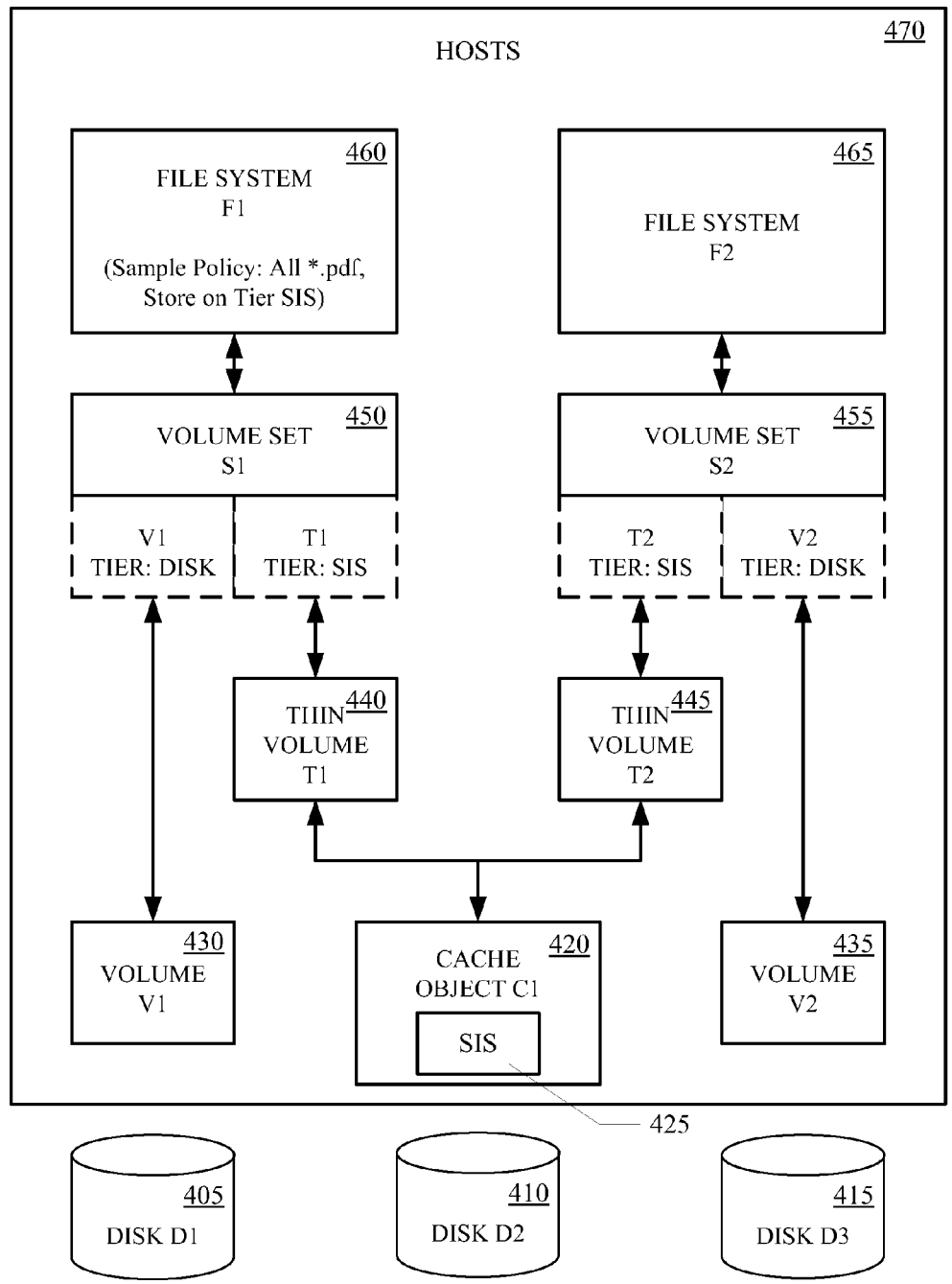
FIG. 4 shows a block diagram of an exemplary multiple file system singe instance store, in accordance with one embodiment of the present technology.

Although FIG. 4 illustrates an implementation where a volume set is on top of the single instance store configuration of thin volumes on top of the cache object, it is appreciated that other configurations and combinations thereof are also possible. For example, a file system may be created on top of a thin volume instead of a volume set.

At 350, one or more policies are created that specify what data is stored on what volumes, thereby dynamically tiering the data on the file system 400, based upon the one or more commands and one or more parameters. Policies may be specified based on one or more attributes of the data and/or characteristics of the storage devices. The policies may be specified by one or more of a plurality of attributes are stored as metadata associated with each file such as the length of the data in a file, the time the file was last modified, the file creation time, the time the file was last accessed, the last time that the file's metadata was changed, the file's device type, the files owner (e.g., user-ID, group-ID), the files access permission settings (e.g., read-only, executable), the character encoding, a checksum, and/or the like. A policies may also be specified base on one or more characteristic of the storage device such as the storage type, access speed, access latency, store cost, or the like (e.g., emc array, Hitachi array, NADA array). The tier describes the quality of the storage and is user definable.

In one embodiment, the file manager receives one or more commands and one or more parameters for configuring one or more policies. The file manager transforms the one or more commands and one or more parameters into information creating the policies. The information creating the one or more policies is stored in a configuration file of the file manager.

In one implementation, a policy may be set at the file system level 460, for example, that specifies that data of a certain type (PDF files) are to be written to the single instance store tier (TIER:SIS) instead of the disk tier (TIER: DISK). Furthermore, policies may be set to migrate data out of a cache object.

In an input/output (I/O) requests handling phase, the storage device backing the single instance store de-duplicates (e.g., deduping) the data and/or memory accesses are selectively single instance stored based on one or more policies, at 360. The I/O request handling phase is explained below in more detail with regard to FIGS. 7 and 8.

Figure 5:
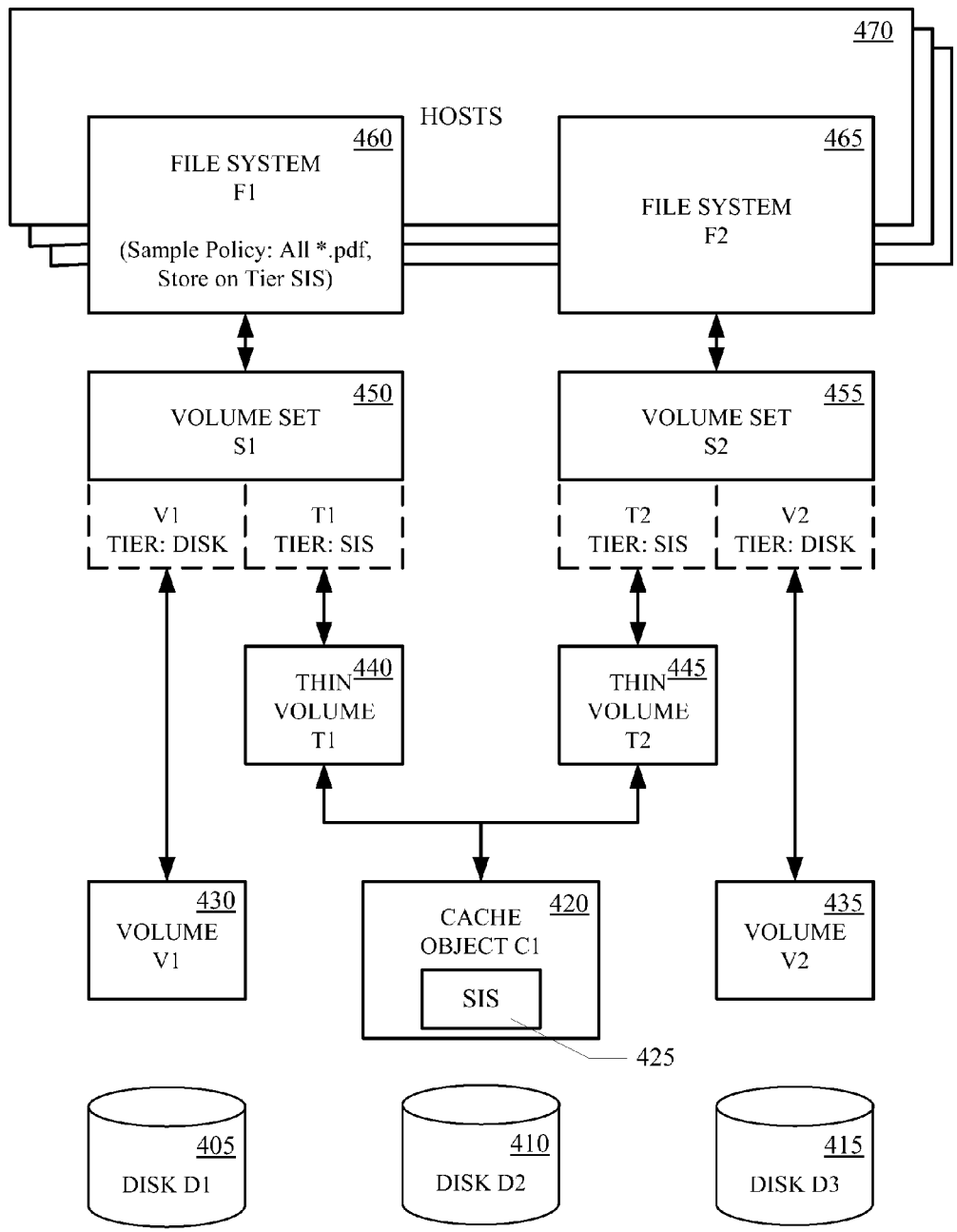
FIG. 5 shows a block diagram of an exemplary multiple file system multi-host single instance store, in accordance with another embodiment of the present technology.
Figure 6:
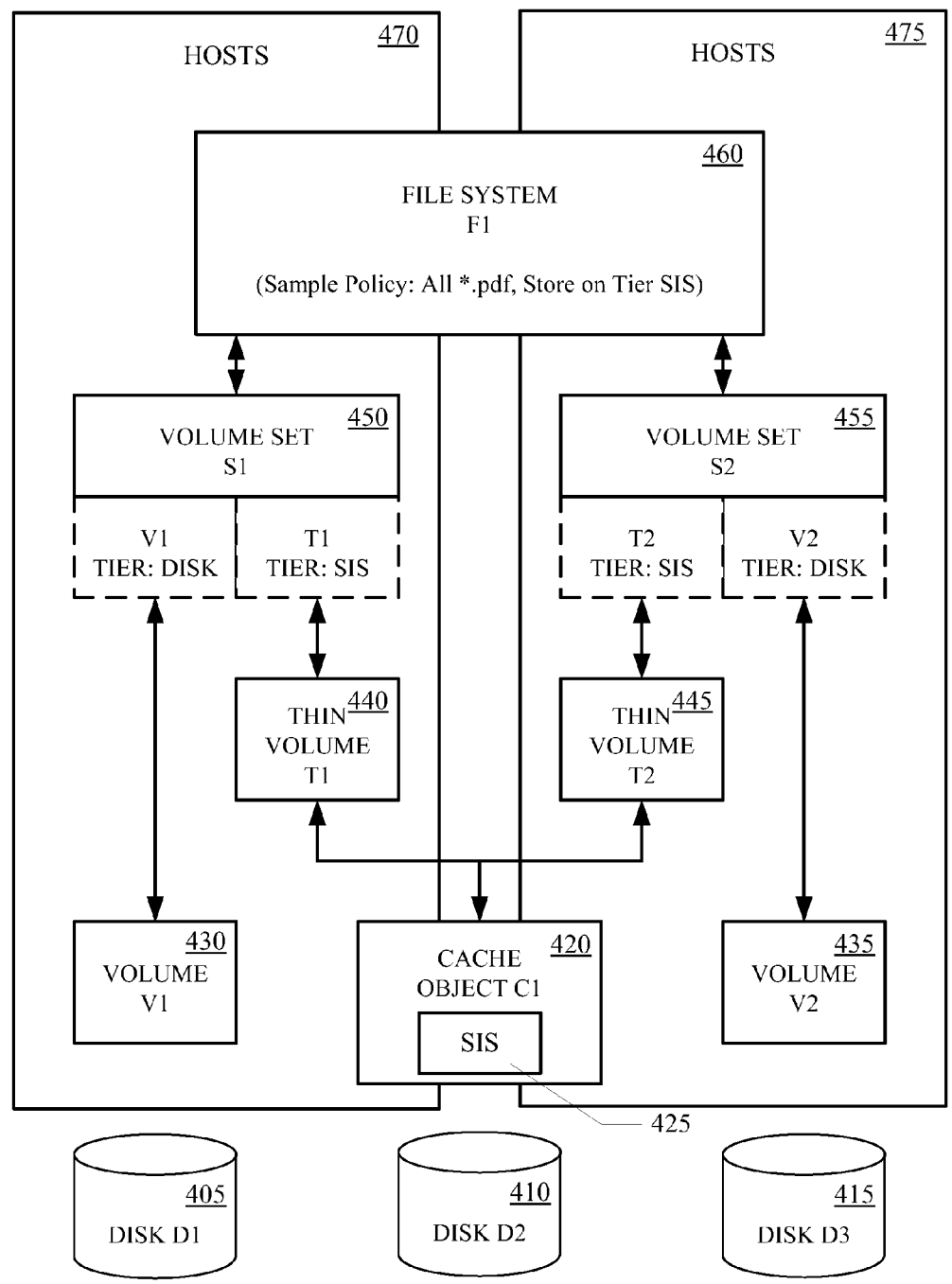
FIG. 6 shows a block diagram of an exemplary multi-host single instance store, in accordance with another embodiment of the present technology.

Referring now to FIG. 5, an exemplary multiple file system multi-host single instance store as described above is shown. The single instance store is shared across multiple file systems and multiple hosts. FIG. 6 shows an exemplary multi-host single instance store as described above. For the single instance store, a single file system is shared across multiple hosts.

Figure 7:
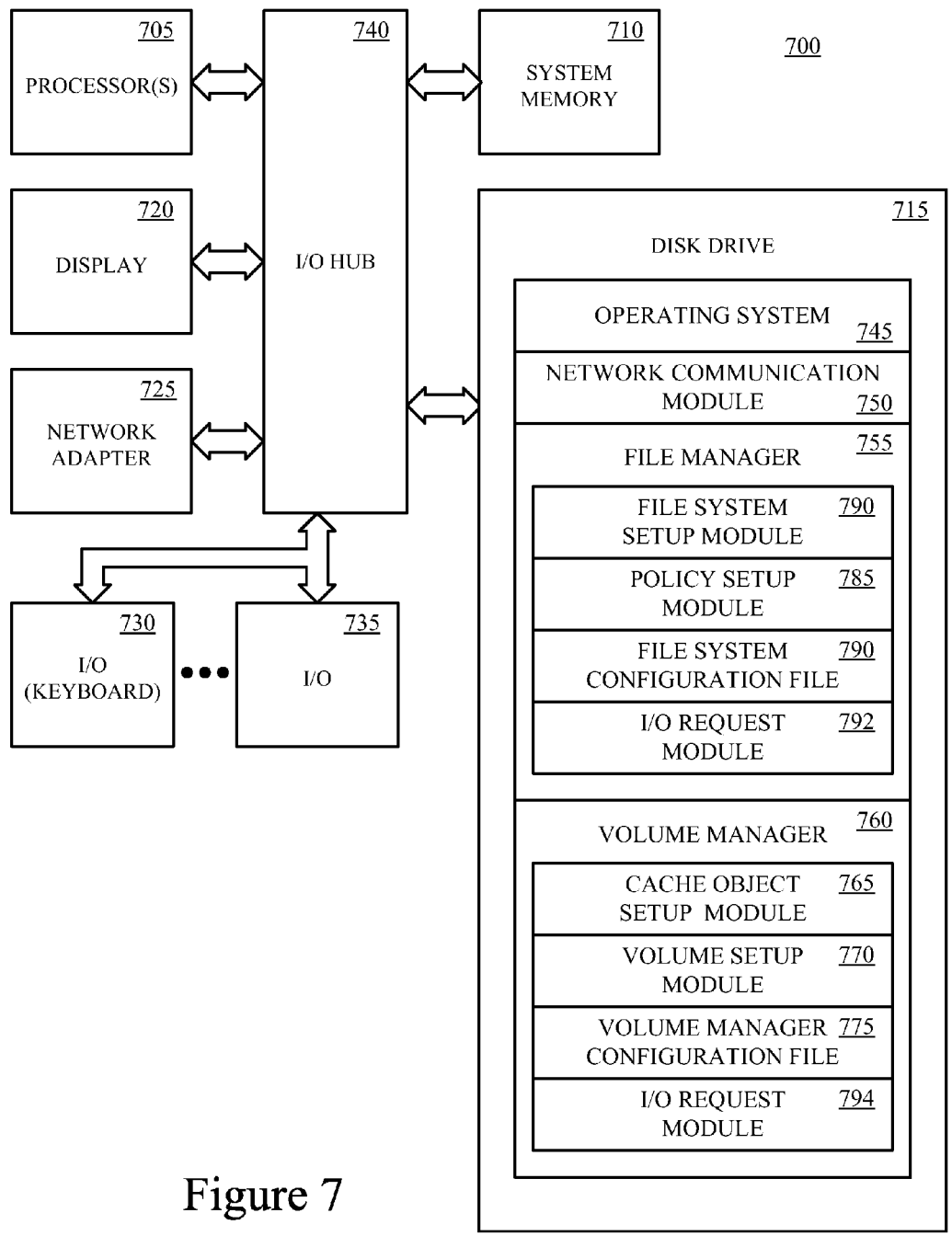
FIG. 7 shows a block diagram of a computing device, in accordance with one embodiment of the present technology.

Referring to FIG. 7, a computing device 700, in accordance with one embodiment of the present technology, is shown. The exemplary computing device may include one or more processors 705, volatile and/or non-volatile memory (e.g., computer readable media) 710, 715, one or more peripheral devices 720-735, and an input/output hub 740, communicatively coupled by one or more busses. The input/output hub 740 acts to communicate data and instructions between the one or more processors 705, the computing device-readable media 710, 715, and the peripheral devices 720-735.

The computing device-readable media 710, 715 may be characterized as primary memory and secondary memory. Generally, the secondary memory, such as a magnetic and/or optical storage, provides for non-volatile storage of computer-readable instructions and data for use by the computing device. For instance, the disk drive 715 may store the operating system (OS), utilities, routines, modules, user applications, and data. The primary memory, such as the system memory 710, provides for volatile storage of computer-readable instructions and data for use by the computing device. For instance, the system memory 710 may temporarily store portions of the operating system, one or more utilities, routines, modules, user applications and associated data for execution by the CPU 705.

The one or more computing device-readable media 715, 710 includes computing device executable instructions of an operating system 745, a network communication module 750, a file manager 755, a volume manager 760 and other applications, utilities, routines and modules. The following described applications, utilities, routines and modules are only exemplary. It is appreciated that the various utilities, routines, and modules may be combined together or separated in further modules, routines and/or utilities according to a particular embodiment. The operating system 745 provides for controlling the hardware portion of the computing device 700. The network communication module provides for controlling communication over one or more network connection. The volume manager 760 provides for the setup of one or more volumes and handling of input/output (I/O) requests. The volumes exist at the logical operating system (OS) level and are utilized by an operating system to access data stored on a corresponding accessible storage area (e.g., hard disk driver, partition). The file manager 755 provide for the setup of one or more file systems and handling of input/output (I/O) request. The file system is a special-purposed database for the storage, organization, manipulation and retrieval of data.

In one embodiment, the volume manager 760 includes a cache object setup module 765 and a volume setup module 770. The volume manager receives one or more commands and one or more parameters for configuring a cache object used for implementing a single instance store. In one implementation, a user enters one or more commands and one or more parameters through a text based configuration interface of the volume manager. The cache object setup module transforms the one or more commands and one or more parameters into information creating the cache object on top of one or more backing stores used for implementing one or more single instance store solutions. The information creating the cache object and the single instance store solution is stored in a configuration file 775 of the volume manager. The volume manager 760 also receives one or more commands and one or more parameters for configuring one or more volumes, including creating a plurality of thin volumes on top of each cache object. The one or more commands and one or more parameters may also configure the volumes and thin volumes in one or more volume sets. The volume setup module transforms the one or more commands and one or more parameters into information creating the volumes on top of each accessible storage area, including creating a plurality of thin volumes on top of each cache object. The information creating the volumes, including the plurality of thin volumes, is stored in the configuration file 775 of the volume manager.

The file manager receives one or more commands and one or more parameters for creating one or more file systems on top of the one or more volumes. In one implementation, a user enters one or more commands and one or more parameters through a text based configuration interface of the file manager. The file system setup module transforms the one or more commands and one or more parameters into information creating the file systems on top of the one or more volumes. The information creating the file systems is stored in a configuration file 790 of the file manager. The file manager 755 also receives one or more commands and one or more parameters for configuring one or more policies. The policies may specify what data is stored on what volumes, and may include dynamic storage tiering. The policy setup module 785 transforms the one or more commands and one or more parameters into information creating the policies. The information creating the one or more policies may also be stored in the configuration file 790 of the file manager.

Figure 8:
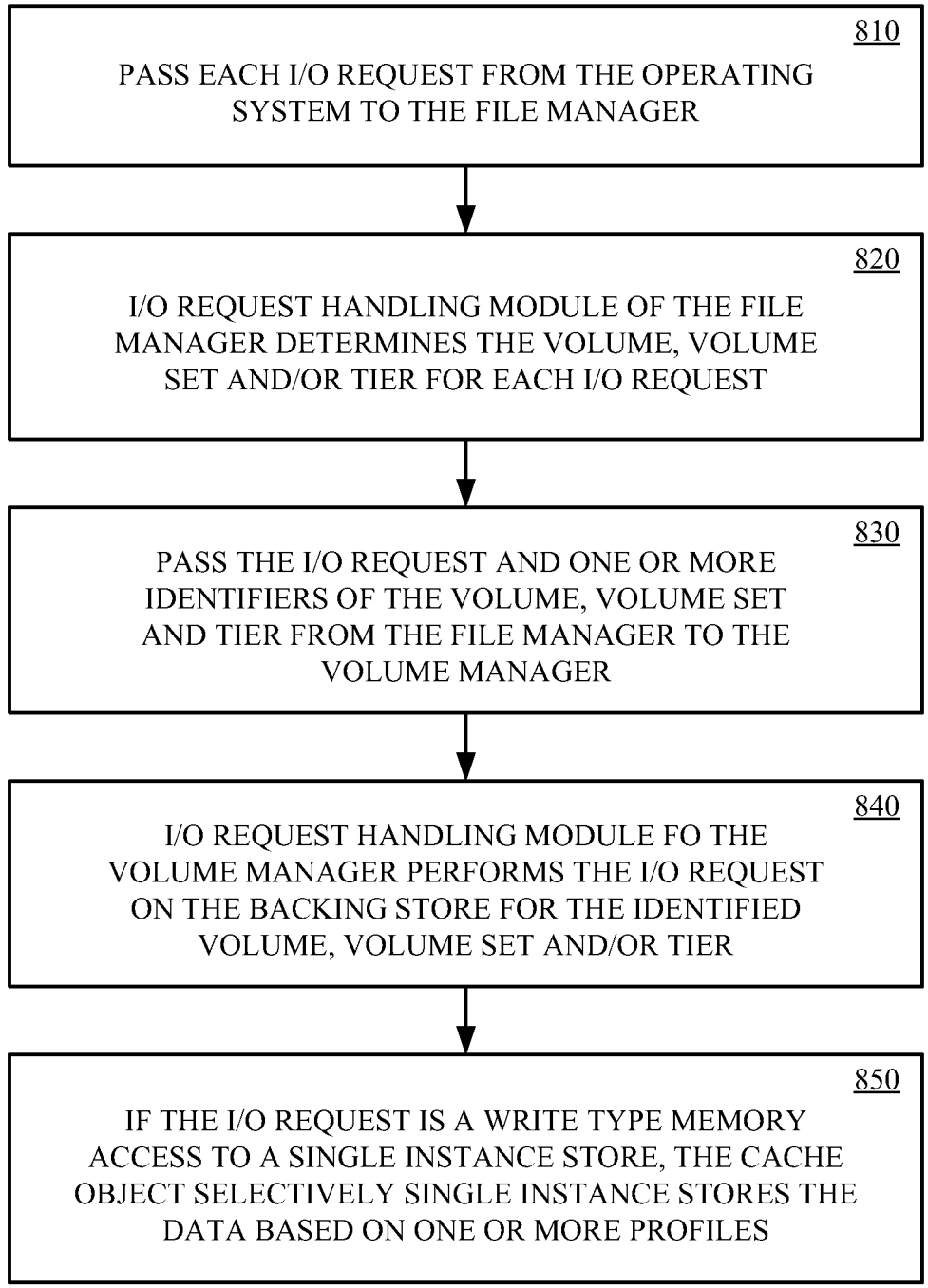
FIG. 8 shows a flow diagram of a method of I/O request handling in one or more single instance stores implemented across one or more file systems and/or one or more hosts, in accordance with one embodiment of the present technology.

I/O request handling will be further described with reference to FIG. 8, which shows a method of I/O request handling in one or more single instance stores implemented across one or more file systems and/or one or more hosts, in accordance with one embodiment of the present technology. The method begins with the operating system (OS) 745 passing I/O requests to the file manager 755, at 810. The I/O request may be a read, write or the like memory access. The I/O request handling module 792 of the file manager 790 determines the volume, volume set, and/or tier of each I/O request based on one or more policies in the volume manager configuration file, at 820. At 830, the I/O request and one or more identifiers of the volume, volume set, and/or tier is passed from the file manager to the volume manager. The I/O request handling module of the volume manager performs the I/O request on the backing store for the identified volume, volume set, and/or tier, at 840. If the I/O request is a write type memory access to a single instance store, the data is selectively single instance stored by the cache object based on one or more profiles, at 850.

Accordingly, upon receiving a corresponding input/output request, the cache file manager and volume manager using the cache object selectively single instance stores write type memory accesses based on one or more policies. In one implementation, the single instance store module 785 stores single instances of memory access to the single instance store based on the one or more policies. In another implementation, a daemon routine searches the one or more backing stores of the single instance store, in the background, to detect multiple copies of the same instance of data. The pointer in the file system for each multiple instance of the data is changed to the location of a single copy and deletes the duplicate copies. In another implementation, a background routine checks one or more metadata parameters of data stored on the single instance backing stores and/or the non-single instance backing stores against one or more policies, and move data between the non-single instance backing stores and the non-single instance backing stores based on the metadata parameters of the data and the applicable policies.

Accordingly, execution of the computing device executable instructions of the file manager 755 and the volume manager 760 by the one or more processors creates a volume stack, including a plurality of volume sets, wherein the plurality volume sets each include a thin volume on top of a cache object implementing a single instance store. Execution of the computing device executable instructions also creates a file system stack, including one or more file systems, on top of the volume stack. The cache object is shared between the volume sets. The single instance store is shared between the plurality of file systems and/or a plurality of hosts.

Embodiments of the present technology advantageously utilize a single cache object store that can span file systems and/or hosts. Embodiments of the present technology may be utilized for on-host storage management. Embodiments of the present technology may be embodied in an article of manufacture including computing device readable instructions, stored on one or more computing device readable media, which when executed by one or more processors implement a set of storage management tools. The storage management tools create one or more volume stacks shared across one or more file systems and/or hosts that share a cache object implementing a single instance store solution.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
receiving one or more commands and one or more parameters to create a single instance store, a plurality of volumes, a cache object on top of a backing store of the single instance store, and one or more file systems, wherein the plurality of volumes comprises a plurality of thin volumes created on top of the cache object, and wherein blocks in the backing store are allocated in the plurality of thin volumes from the cache object;
storing information creating the cache object and the plurality of volumes, including creating the plurality of thin volumes, in a volume manager configuration file, wherein the plurality of thin volumes allow the single instance store solution to be shared across a plurality of file systems, across a plurality of hosts, or across a plurality of file systems and a plurality of hosts; and
storing information creating the one or more file systems in a file system configuration file, wherein each file system is created on top of the plurality of volumes including the plurality of thin volumes.

2. The method according to claim 1, wherein the one or more file systems include dynamic storage tiering.

3. The method according to claim 1, further comprising:
receiving one or more commands and one or more parameters to create a policy that specifies what data is stored on the single instance store solution; and
storing information creating policy in the file system configuration file.

4. The method according to claim 3, further comprising:
receiving input/output requests; and
selectively single instance storing memory accesses based on the policy.

5. The method according to claim 1, further comprising storing information combining one or more volumes and one or more thin volumes into one or more volume sets in the volume manager configuration file, wherein the one or more file systems are each created on one or more volume sets.

6. The method according to claim 5 wherein a cache object is shared between the volume sets.

7. One or more computing device readable media storing computing device executable instructions which when executed perform a method comprising:
receiving one or more commands and one or more parameters to create a single instance store, a plurality of volumes, a cache object on top of a backing store of the single instance store, and one or more file systems, wherein the plurality of volumes comprises a plurality of thin volumes created on top of the cache object, and wherein blocks in the backing store are allocated in the plurality of thin volumes from the cache object;
storing information creating the cache object and the plurality of volumes, including creating the plurality of thin volumes, in a volume manager configuration file, wherein the plurality of thin volumes allow the single instance store solution to be shared across a plurality of file systems, across a plurality of hosts or across a plurality of file system and a plurality of hosts; and
storing information creating the one or more file systems in a file system configuration file, wherein each file system is created on top of the plurality of volumes including the plurality of thin volumes.

8. The one or more computing device readable media computing device executable instructions which when executed perform the method of claim 7, wherein the one or more file systems include dynamic storage tiering.

9. The one or more computing device readable media having storing computing device executable instructions which when executed perform the method of claim 7, further comprising:
receiving one or more commands and one or more parameters to create a policy that specifies what data is stored on the single instance store solution; and
storing information creating policy in the file system configuration file.

10. The one or more computing device readable media storing computing device executable instructions which when executed perform the method of claim 9, further comprising:
receiving input/output requests; and
selectively single instance storing memory accesses based on the policy.

11. The one or more computing device readable media storing computing device executable instructions which when executed perform the method of claim 7, further comprising storing information combining one or more thin volumes into one or more volume sets in the volume manager configuration file; wherein the one or more file systems are each created on one or more volume sets.

12. A storage system comprising:
one or more processors coupled to one or more computing device readable media and executing computing device readable code stored in the one or more computing device readable media which implement one or more modules, wherein the one or more modules:
receive one or more commands and one or more parameters to create a single instance store, a plurality of volumes, a cache object on top of a backing store of the single instance store, and one or more file systems, wherein the plurality of volumes comprises a plurality of thin volumes created on top of the cache object, and wherein blocks in the backing store are allocated in the plurality of thin volumes from the cache object;
store information creating the cache object and the plurality of volumes, including creating the plurality of thin volumes, in a volume manager configuration file wherein the plurality of thin volumes allow the single instance store solution to be shared across a plurality of file systems, across a plurality of hosts or across a plurality of file system and a plurality of hosts; and
store information creating the one or more file systems in a file system configuration file, wherein each file system is created on top of the plurality of volumes including the plurality of thin volumes.

13. The storage system of claim 12, wherein the one or more modules:
receive one or more commands and one or more parameters to create a policy that specifies what data is stored on the single instance store solution; and
store information creating policy in the file system configuration file.

14. The storage system of claim 12 wherein the one or more modules:
receive input/output requests; and
selectively single instance store memory accesses based on the policy.

15. The storage system of claim 12, wherein the one or more modules store information combining one or more volumes and one or more thin volumes into one or more volume sets in the volume manager configuration file, wherein the one or more file systems are each created on one or more volume sets.

* * * * *